US006460638B1

(12) United States Patent
Strunsee et al.

(10) Patent No.: US 6,460,638 B1
(45) Date of Patent: Oct. 8, 2002

(54) BUSHING FOR PROTECTING AN ELECTRICAL WIRE PASSING THROUGH A HOLE IN A STRUCTURAL MEMBER

(75) Inventors: Thomas E. Strunsee, Waukesha, WI (US); Thomas M. Luebke, Menomonee Falls, WI (US); Bernard J. Ziebart, Pewaukee, WI (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 09/968,159

(22) Filed: Oct. 1, 2001

(51) Int. Cl.⁷ .................................................. H02G 3/18
(52) U.S. Cl. ................. 179/65 G; 174/152 G; 174/135; 16/2.2; 248/56
(58) Field of Search ............................ 174/65 G, 65 SS, 174/152 G, 153 G, 135, 151, 65 R; 248/56; 16/2.1, 2.2

(56) References Cited

U.S. PATENT DOCUMENTS

| | | | |
|---|---|---|---|
| 2,912,712 A | | 11/1959 | Shamban et al. |
| 3,562,847 A | | 2/1971 | Jemison |
| 3,584,888 A | * | 6/1971 | Lott ........................ 174/65 G |
| 3,887,960 A | | 6/1975 | Sherman |
| 4,137,602 A | * | 2/1979 | Klumpp, Jr. ............ 174/153 G |
| 4,262,181 A | | 4/1981 | Tufano et al. |
| 4,520,976 A | | 6/1985 | Cournoyer et al. |
| 5,595,453 A | | 1/1997 | Nattel et al. |
| 5,596,177 A | | 1/1997 | Stark et al. |
| 5,736,677 A | * | 4/1998 | Sato et al. .............. 174/152 G |
| 6,150,607 A | * | 11/2000 | Weyl et al. ............... 174/65 G |
| 6,184,467 B1 | * | 2/2001 | Milanowski et al. ..... 174/65 G |
| 6,259,024 B1 | * | 7/2001 | Daoud ...................... 174/65 G |

* cited by examiner

*Primary Examiner*—Dean A. Reichard
*Assistant Examiner*—Dhiru R Patel
(74) *Attorney, Agent, or Firm*—George E. Haas; Quarles & Brady LLP

(57) ABSTRACT

A bushing for a hole in a structural member includes a flange with an aperture there through. A plurality of tabs are hinged to the flange at locations around the aperture. During installation of the bushing, the plurality of tabs are inserted into the hole with the flange being located on one side of the structural member. The plurality of tabs then are flared outward on the opposite side of the structural member to prevent the bushing from being extracted from the hole. A plurality of latches retain the tabs in the flared position.

19 Claims, 2 Drawing Sheets

BUSHING FOR PROTECTING AN ELECTRICAL WIRE PASSING THROUGH A HOLE IN A STRUCTURAL MEMBER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to bushings for insertion into holes in a structural member, such as a metal wall stud, to protect electrical wires that pass through that hole.

2. Description of the Related Art

In many instances, metal studs are being used in the walls of buildings instead of conventional wooden studs. The metal studs are fabricated by bending sheet metal to form an elongated member having a "C" shaped cross section. Holes are punched in the wide side of the metal stud to allow wires and pipes to be run within the wall. The relatively thin edge of these holes can abrade and cut the insulation of the wires and cables being pulled through the studs during installation and in several cases damage to the metal conductors of the cable can occur. As a consequence, electricians have to exert extreme care when installing wires through metal studs.

As a solution to this problem, bushings have been devised which are placed into the respective openings in the metal studs and then the wires and cables are run through the bushing. Such bushings are fabricated of rubber or plastic and have surfaces against which the wires may rub with negligible abrasion. As a consequence, the bushings protect the wires both during installation and thereafter.

It is desirable that such bushings be easy and quick so that the labor required to install electrical wires and cables is not increased significantly. In this regard, it is therefore desirable that the bushing be fabricated as a single piece to eliminate the need for the electrician to locate multiple components and then assemble them in the hole of the stud. For example, U.S. Pat. No. 5,596,177 discloses a single piece bushing in which a backing flange is attached to a mating face flange by a strap. However, this type of bushing requires that the aperture in the stud be large enough to enable the backing flange to pass there through so that the face and backing flange ultimately are at opposite sides of the stud aperture when the bushing is fully assembled.

SUMMARY OF THE INVENTION

A bushing for a hole in a structural member, such as a metal stud, includes a flange which is larger in at least one dimension than the hole. The flange has an aperture there through and a plurality of tabs are connected to the flange at locations around the aperture. The tabs are bendable between a first position in which the plurality of tabs is able to enter the hole in the structural member and a second position in which the plurality of tabs retains the bushing in the hole.

When the bushing is installed, the plurality of tabs are inserted into the hole with the flange abutting a surface on one side of the structural member. The plurality of tabs are then bent to flare outward on the opposite side of the structural member. In the preferred embodiment, the bushing has a latching mechanism attached to the flange which maintains the plurality of tabs in the bent second position.

DETAILED DESCRIPTION OF THE INVENTION

Figure 1:
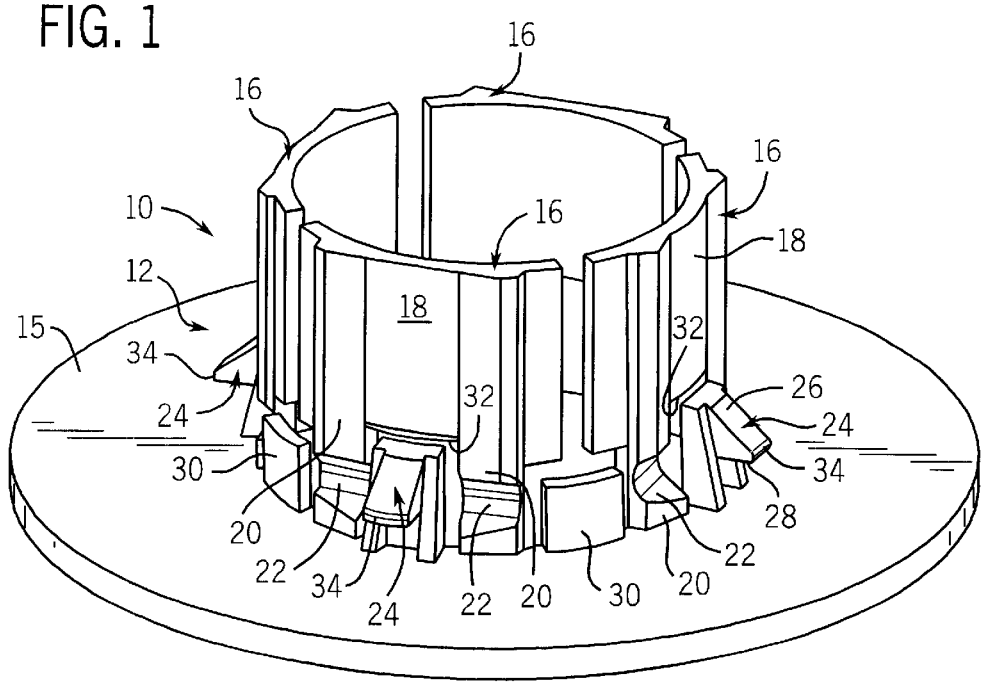
FIG. 1 is an isometric view of a bushing according to the present invention.
Figure 2:
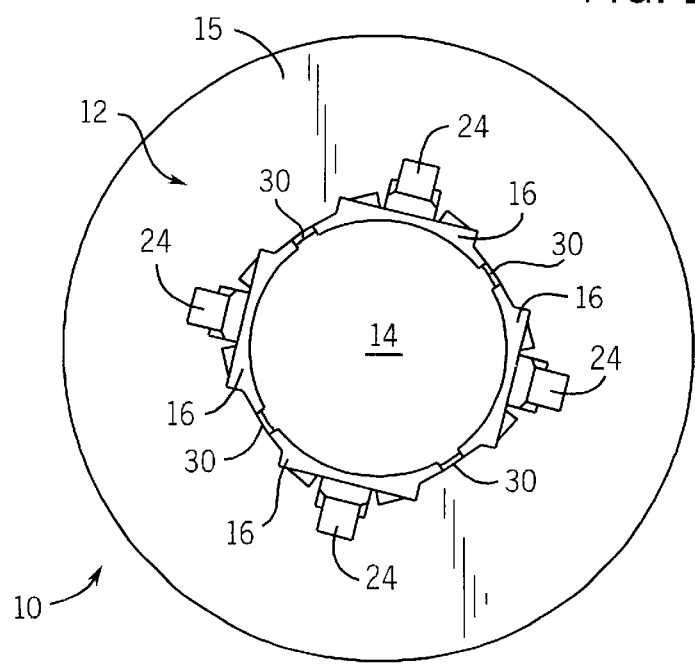
FIG. 2 is top view of the bushing in FIG. 1.

With initial reference to FIGS. 1 and 2, a bushing 10 has a planar, annular flange 12 with a central, circular aperture 14 extending there through. Four tabs 16 project from one surface 15 of the flange 12 and are equidistantly spaced around the central aperture 14. The tabs 16 are curved with a radius that conforms to the radius of the central aperture 14. Thus, the four tabs 16 in a first position, as illustrated, form a generally cylindrical, tubular structure projecting from the one surface 15 of the flange 12. As will be described, this tubular structure is able to enter an opening in a structural member, such as a metal stud for example.

Each of the tabs 161 as body 18 from which two legs 20 extend and which are connected to the flange 12. Each of the legs 20 has a transverse notch 22 which reduces the thickness of the leg. The notches 22 form hinge portions in each leg that enable the respective tab 16 to bend downward approximately 90 degrees into a second position in which the body 18 is substantially parallel to the flange 12. Because of the curvature of the tabs, one will appreciate that in the second position each tab is not exactly parallel to the plane of the flange 12. As will be described, the bushing is placed into this second position upon being installed on a structural member.

Although a circular central aperture 14 and correspondingly curved tabs 16 are shown in the illustrated embodiment of the exemplary bushing 10, a rectangular aperture could be provided with straight tabs along each side of the aperture. This variation of the bushing would be particularly useful with rectangular apertures often found in metal studs. In addition, the flange also could have a different geometric shape appropriate to the shape of the central aperture. Similarly, other geometrically shaped central apertures and flanges can be designed to correspond to the shape of the stud aperture in which the bushing is to be used.

A separate latch 24 is located in a notch of each tab 16 that is formed between the pair of legs 20. The tab 16 extends upward from the surface of the flange 12. Each latch 24 has a tapered upper surface 26 which extends downward to a flat hook edge 28. Thus, there are four latches 24, each associated with a different one of the plurality of tabs 16.

Four short walls 30 extend upwardly from the surface of the flange 12 with each wall 30 being located in the notch between a pair of adjacent tabs 16. Each wall is curved to conform to the circumference of the central circular aperture 14 in the flange. As will be described, these walls aid in centering the flange in the opening of the stud, and also shield wires passing through the stud from the edges of the stud aperture adjacent the corresponding locations of the bushing.

Figure 3:
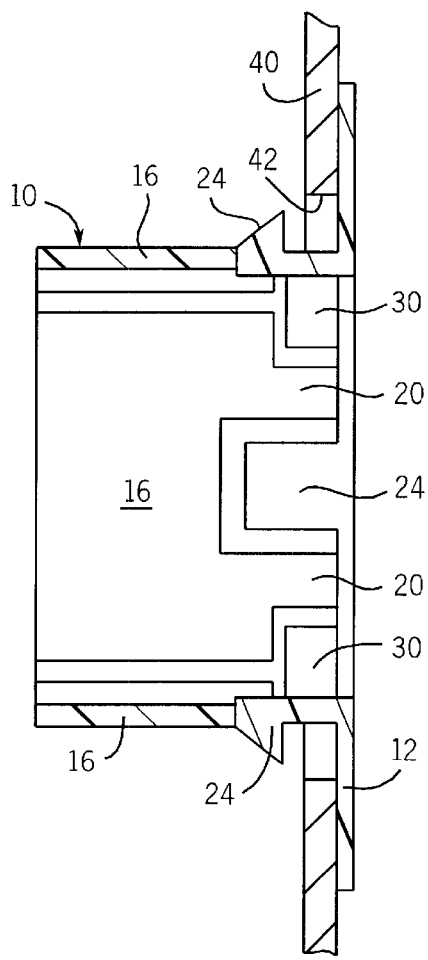
FIG. 3 is a cross-sectional view of the bushing in an intermediate stage of installation on a metal stud.

Referring to FIG. 3 the bushing 10 is used by inserting the generally cylindrical configuration of the four tabs 16 through a hole 42 in a metal stud 40. The stud typically is manufactured with such holes 42 that have standard size and shapes. Alternatively, an electrician may use a hole cutting tool to create custom sized holes at desired locations in the stud. As seen in the illustration, the bushing 10 is sized so that the tabs 16 and latches 24 will ass easily through the stud hole 42 when the tabs are in the first position illustrated. The stud hole 42 can be smaller than that illustrated so that the latches 24 bend and snap over the edges of that hole. The geometric shape of the stud hole 42 does not limit the use of the bushing 10. That is, although the exemplary version of the bushing 10 is illustrated with the four tabs 16 located in a circular configuration, that bushing can be used with rectangular or other shaped stud holes as long as the assembly of tabs 16 can pass through the hole and the flange 12 is large enough to preclude the entire bushing from passing through the hole. The flange has to be larger than the hole, but does not have to entirely cover the hole. For example the corners of a square stud hole the may be slightly exposed, yet the flange may have a diameter that is greater than the length of each side of the square and still is considered to be larger than the hole. The key characteristic is that the size of the flange preclude the entire bushing from passing through the hole when completely installed.

Figure 4:
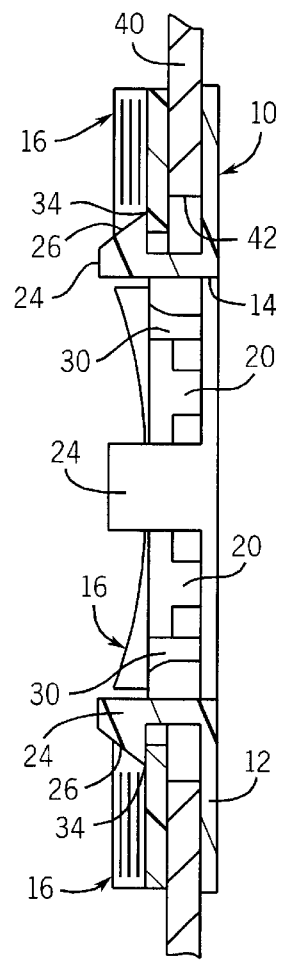
FIG. 4 is a cross-sectional view of the bushing completely installed on the metal stud.

Once the tabs have been inserted through the hole, the flange 12 is held against one surface of the stud 40. The installer then bends each of the four tabs 16 outward, flaring them away from the central aperture 14 and against the opposite surface of the stud 40 as shown in FIG. 4. In doing so, each of the tabs 16 bends about the hinge notch 22 in the legs 20 of the tab. As this bending occurs, an edge 32 which is between the two legs 20 of each tab 16, rubs along the tapered surface 26 of the corresponding latch 24. This engagement forces the latch 24 to bend slightly allowing the tab edge 32 to pass over the tip 34 of the latch after which the latch springs back into its original position wherein latch surface 38 engages the tab 16 to hold the tab in a bent second position against the stud 40. When all four of the tabs 16 are so positioned and latched in place, the bushing 10 is captivated in the hole 42 of the stud wherein the stud 40 is held between the flange 12 and each of the four tabs 16.

After installation, wires and cables can be passed through the central aperture 14 in the bushing 10, with the interior surfaces of the tabs 16, latches 24 and walls 30 shielding the wires and cables from contact with the edge of the aperture 42 in the metal stud 40. Thus, the relatively smooth, soft plastic surfaces of the bushings 10 virtually eliminate abrasion of the wire and cables as they are pulled through the bushing.

The foregoing description was primarily directed to a preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

We claim:

1. A bushing for a hole in a structural member, said bushing comprising:
   a flange having an aperture there through;
   a plurality of tabs hinged to the flange at locations adjacent the aperture and having a first position in which the plurality of tabs are able to enter the hole and a second position which prevents the bushing from being extracted from the hole; and
   a plurality of latches to retain the plurality of tabs in the second position.

2. The bushing as recited in claim 1 wherein each of the plurality of tabs comprises a body coupled to the flange by a pair of legs, with each leg having a hinge portion at which the leg bends.

3. The bushing as recited in claim 2 wherein each of the plurality of latches is located between the pair of legs of a different one of the plurality of tabs and engages the body of the respective tab in the second position.

4. The bushing as recited in claim 1 wherein each of the plurality of tabs comprises a body coupled to the flange by a pair of legs, with each leg having transverse groove forming a hinge at which the leg bends.

5. The bushing recited in claim 4 further comprising a plurality of walls each of which is attached to the flange between legs of two adjacent ones of the plurality of tabs.

6. The bushing as recited in claim 1 further comprising a plurality of walls extending from the flange and each of which is located between adjacent ones of the plurality of tabs.

7. The bushing as recited in claim 1 wherein the aperture in the flange has a circular shape and the plurality of tabs is equidistantly spaced around the aperture.

8. The bushing as recited in claim 7 wherein in the first position, each of the plurality of tabs is curved to conform to a circumference of the aperture in the flange.

9. The bushing as recited in claim 1 wherein the structural member is captivated between the flange and the plurality of tabs in the first position.

10. A bushing for a hole in a structural member, said bushing comprising:
    a flange larger than the hole in the structural member and having an aperture there through;
    a plurality of tabs connected to the flange at locations around the aperture, each tab being moveable between a first position in which the plurality of tabs is able to enter the hole and a second position in which the plurality of tabs retains the bushing in the hole; and
    a latch mechanism that holds the plurality of tabs in the second position.

11. The bushing as recited in claim 10 wherein each of the plurality of tabs comprises a body coupled to the flange by a pair of legs with each leg having a hinge portion.

12. The bushing as recited in claim 11 wherein the hinge portion comprises a transverse groove in each leg.

13. The bushing as recited in claim 10 wherein the latch mechanism comprises a separate latch associated with each one of the plurality tabs and engaging the respective tab in the second position.

14. The bushing as recited in claim 10 wherein each of the plurality of tabs has a groove at which the respective tab bends.

15. The bushing as recited in claim 10 further comprising a plurality of walls each of which is attached to the flange between adjacent ones of the plurality of tabs.

16. A bushing for a hole in a structural member, said bushing comprising:
    a flange larger than the hole in the structural member and having an aperture there through; and
    a plurality of tabs connected to the flange at locations around the aperture, and being bendable between a first position in which the plurality of tabs is able to enter the hole and a second position in which the plurality of tabs extends substantially parallel to the flange and retains the bushing in the hole.

17. The bushing as recited in claim 16 further comprising a plurality of latches which hold the plurality of tabs in the second position.

18. The bushing as recited in claim 16 wherein each of the plurality of tabs has a groove at which the respective tab bends.

19. The bushing as recited in claim 17 wherein each of the plurality of tabs comprises a body coupled to the flange by a pair of legs, with each leg having a hinge portion.

* * * * *

UNITED STATES PATENT AND TRADEMARK OFFICE
CERTIFICATE OF CORRECTION

PATENT NO.     : 6,460,638 B1
DATED          : October 8, 2002
INVENTOR(S)    : Thomas E. Strunsee et al.

It is certified that error appears in the above-identified patent and that said Letters Patent is hereby corrected as shown below:

<u>Column 4,</u>
Line 63, replace with the following:
-- 19. The bushing as recited in claim 16 wherein each of the plurality of tabs comprises a body coupled to the flange by a pair of legs, with each leg having a hinge portion. --

Signed and Sealed this

Eighteenth Day of March, 2003

JAMES E. ROGAN
*Director of the United States Patent and Trademark Office*